United States Patent
Schech et al.

(10) Patent No.: US 9,726,358 B2
(45) Date of Patent: Aug. 8, 2017

(54) ILLUMINATING DEVICE

(71) Applicant: Schrims GmbH, Friedberg (DE)

(72) Inventors: Christian Schech, Berlin (DE); Bastian Wetzel, Darmstadt (DE)

(73) Assignee: Schrims GmbH, Friedberg (DE)

( * ) Notice: Subject to any disclaimer, the term of this patent is extended or adjusted under 35 U.S.C. 154(b) by 0 days.

(21) Appl. No.: 14/940,020

(22) Filed: Nov. 12, 2015

(65) Prior Publication Data

US 2016/0069553 A1    Mar. 10, 2016

Related U.S. Application Data

(63) Continuation of application No. 13/820,501, filed as application No. PCT/EP2011/004358 on Aug. 30, 2011, now Pat. No. 9,198,261.

(30) Foreign Application Priority Data

Sep. 3, 2010   (DE) .................. 10 2010 044 320

(51) Int. Cl.
  *A45C 15/06*    (2006.01)
  *F21V 23/04*    (2006.01)
  (Continued)

(52) U.S. Cl.
  CPC .......... *F21V 23/0414* (2013.01); *A45C 15/06* (2013.01); *A45D 42/10* (2013.01);
  (Continued)

(58) Field of Classification Search
  CPC ............... F21V 23/0414; F21V 23/023; F21V 23/0471; F21V 23/0485; F21V 33/004;
  (Continued)

(56) References Cited

U.S. PATENT DOCUMENTS 5,018,057 A    5/1991  Biggs et al.
6,340,235 B1 *  1/2002  Bryan ........................ 362/156
(Continued)

FOREIGN PATENT DOCUMENTS

DE    91 14 298 U1    5/1992
DE    94 15 106 U1    2/1996
(Continued)

OTHER PUBLICATIONS

German Office Action dated Jun. 9, 2011, in German Patent Application No. 10 2010 044 320.4, filed Mar. 8, 2012, 6 pages.
(Continued)

*Primary Examiner* — Brandon S Cole
(74) *Attorney, Agent, or Firm* — Christensen O'Connor Johnson Kindness PLLC

(57) ABSTRACT

An illumination device that is operable while being transported and that can be placed, or is placed, in an object that can be opened and closed again. The illumination device comprises a first light source, an electric energy storage device, and a switch device that comprises a control unit including a sensor unit with which a first switching unit is transferable from an open switching state into a closed switching state. The first light source is suppliable with electric power from the electric energy storage device when a first sensor is touched and/or when said first sensor detects a motion. The sensor unit comprises a second sensor that at least detects if the object is open or closed. A second switching unit is transferable from an open switching state into a closed switching state in which the first light source and/or a second light source is/are supplied with electric power.

9 Claims, 1 Drawing Sheet

(51) Int. Cl.
*A45D 42/10* (2006.01)
*H05B 37/02* (2006.01)
*F21V 23/02* (2006.01)
*F21V 33/00* (2006.01)
*F21W 121/06* (2006.01)
*F21W 131/302* (2006.01)

(52) U.S. Cl.
CPC ........ *F21V 23/023* (2013.01); *F21V 23/0471* (2013.01); *F21V 23/0485* (2013.01); *F21V 33/004* (2013.01); *H05B 37/0227* (2013.01); *F21W 2121/06* (2013.01); *F21W 2131/302* (2013.01)

(58) Field of Classification Search
CPC .... A45D 42/10; A45C 15/06; H05B 37/0227; F21W 2121/06; F21W 2121/302
USPC .................................................. 315/149–159
See application file for complete search history.

(56) References Cited

U.S. PATENT DOCUMENTS

| | | | |
|---|---|---|---|
| 7,207,689 | B2 | 4/2007 | Tait |
| 8,147,086 | B2* | 4/2012 | Tait ............................ 362/156 |
| 2005/0002181 | A1 | 1/2005 | Chernick et al. |
| 2005/0047120 | A1 | 3/2005 | Sargent |
| 2005/0057923 | A1 | 3/2005 | Catherine Kurcz et al. |
| 2005/0078481 | A1 | 4/2005 | Hanis et al. |
| 2005/0135083 | A1* | 6/2005 | Tait ............................ 362/103 |
| 2005/0270764 | A1 | 12/2005 | Kurcz et al. |
| 2007/0012349 | A1* | 1/2007 | Gaudiana et al. ............ 136/244 |
| 2007/0253187 | A1 | 11/2007 | Cohan et al. |
| 2008/0083627 | A1 | 4/2008 | Hamm |
| 2008/0198585 | A1* | 8/2008 | Tait ............................ 362/156 |
| 2010/0182797 | A1 | 7/2010 | Wells |
| 2011/0057669 | A1* | 3/2011 | Xu ............................ 324/658 |
| 2011/0133655 | A1 | 6/2011 | Recker et al. |
| 2011/0188229 | A1 | 8/2011 | Rizo Hernandez |
| 2014/0084814 | A1 | 3/2014 | Wells |
| 2015/0022099 | A1 | 1/2015 | Farley et al. |
| 2015/0028751 | A1 | 1/2015 | Dobbins |

FOREIGN PATENT DOCUMENTS

| | | |
|---|---|---|
| DE | 100 63 370 A1 | 9/2002 |
| DE | 102 16 341 A1 | 10/2003 |
| DE | 20 207 011 357 U1 | 3/2008 |
| DE | 10 2008 026 571 A1 | 12/2009 |
| EP | 0 957 756 A1 | 11/1999 |
| KR | 20 2010 0007721 U | 7/2010 |
| WO | 02/00056 A1 | 1/2002 |
| WO | 2006/030469 A2 | 3/2006 |

OTHER PUBLICATIONS

International Search Report dated Nov. 25, 2011, in International Patent Application No. PCT/EP2011/004358, filed Aug. 30, 2011, 3 pages.

* cited by examiner

ILLUMINATING DEVICE

CROSS-REFERENCES TO RELATED APPLICATIONS

This application is a continuation of U.S. application Ser. No. 13/820,501, which is the National Stage of International Application No. PCT/EP2011/004358, filed Aug. 30, 2011, which claims priority to German Application No. 10 2010 044 320.4, filed Sep. 3, 2010, the disclosures of which are hereby incorporated by reference herein.

FIELD

The present disclosure relates to an illumination device that can be put into operation while being transported and that can be placed or is placed in an object that can be opened and closed again.

The device comprises at least a first light source, an electric energy storage device, and a switch device that comprises a control unit including a sensor unit with which a first switching unit is transferable from an open switching state into a closed switching state. The first light source is suppliable with electric power from the electric energy storage device when a first sensor of the sensor unit is touched and/or when said first sensor detects motion.

BACKGROUND

An illumination device not of the type in question is known from DE 20 2007 011 357 U1 where said illumination device is placed in an object that cannot be opened. The light source is activated by motion or by touching. It has proven to be a disadvantage in this case that the illumination device, if placed, for example, in a purse, can be inadvertently activated by objects in the bag, which results in fast discharge of the energy storage in the illumination device.

Furthermore, illumination devices not of the type in question are known, for example, for portable make-up mirrors where a light source is activated when the object that can be opened and closed again is opened. It has proven to be a nuisance that the object, if it is in a lady's purse, for example, can often be found only after a long search.

SUMMARY AND INITIAL DESCRIPTION

The present disclosure provides an illumination device, in which the sensor unit comprises a second sensor that, at least, detects if the object that can be opened and closed again is open or closed, and that the control unit is transferable from an open switching state into a closed switching state in which the first light source and/or a second light source is/are suppliable with electric power from the electric energy storage device.

This ensures that the illumination device is also activated when the object is opened. The first light source is activated as soon as a user approaches the object or touches it. The object illuminates its surroundings and becomes visible. If the object is located in a purse and a user searches for something in the purse, the searching, especially the motion associated with it, is detected and the first light source is supplied with power. This makes the object that can be opened and closed again itself, and objects around it, easily recognizable.

If the user then opens the object that can be opened and closed again, the first light source and/or the second light source is/are supplied with electric power. This enables the user to see the content of the object that can be opened and closed again. If a mirror is inside the object, a user can also see his or her reflection even in the dark due to the first and/or second light source.

The object that can be opened and closed again may be formed of two dome-shaped casing parts that can be folded open and shut by means of a joint.

The second sensor can, in principle, be of any design and include, for example, a physical contact that is separated when the object that can be opened and closed again is opened and restored when the object that can be opened and closed again is closed. It is, however, an advantage if the second sensor of the sensor unit comprises a pushbutton switch, and/or a Hall sensor, and/or a reed contact. In this way, the sensor unit can easily detect the opening and closing of the object that can be opened and closed again.

In general, it is conceivable that the first sensor of the sensor unit can be of any design that captures or detects a user's approach or touch. It is advantageous, however, if the first sensor of the sensor unit is designed such that it can detect a change in brightness, and in particular, comprises a brightness sensor. In this way, the illumination device located, for example, in a lady's purse is only activated if it captures the opening of the purse and an associated change in brightness inside the purse. In this way, the energy stored in the electric energy storage device can be used more efficiently.

In a development of this latter inventive idea, it is advantageous if the control unit releases the first switching unit only if the sensor of the sensor unit detects that the light intensity has dropped below 100 lux, or in some embodiments below 80 lux, 50 lux, or 40 lux. This ensures that the user will only be assisted by the illumination device if the prevailing brightness is below the brightness values mentioned above. This can further increase the efficient use of the electric energy stored in the energy storage device.

In another example of the present disclosure, the first sensor of the sensor unit is functionally assigned to the first light source, and the second sensor of the sensor unit is functionally assigned to the second light source, and the control unit is designed such that the first switching unit is transferred from a closed into an open switching state if the second switching unit is transferred from an open switching state into a closed switching state.

The first light source of the object that can be opened and closed again is arranged such that it shines outwards on the surface or through the surface of the object. The second light source, however, is placed in the object that can be opened and closed again such that it illuminates the contents of the object that can be opened and closed again when the object is opened. In that case, the user no longer needs the light emitted from the first light source. The energy stored in the electric energy storage device can be utilized even more efficiently if the first light source is switched off automatically when the second light source is supplied with power.

In addition, it has proved to be an advantage if the second sensor of the sensor unit comprises a brightness sensor and if the control unit is designed such that it transfers the second switching unit from a closed switching state into an open switching state if the brightness sensor senses a light intensity of more than 100 lux, or in some embodiments more than 80 lux, more than 50 lux, or more than 40 lux. In this way, energy is saved if the second sensor of the sensor unit detects that there is sufficient brightness that the contents of the object that can be opened and closed again can be seen without extra lighting.

In a further development of the present disclosure, the first sensor of the sensor unit is a pyrosensor and/or a capacitive sensor and/or an ultrasonic sensor for detecting motion within an object or a touch of the switch device. This will illuminate the object when a user actively handles it, e.g., if the object that can be opened and closed again is in a bag and the user is searching for something in the bag.

It has proved to be an advantage if the control unit is designed such that the second switching unit switches from the closed switching state back into the open switching state 5 to 60 seconds, especially 10 to 40 seconds, especially 10 to 30 seconds after the second sensor of the sensor unit detected that the object that can be opened and closed again has been opened, and/or that the control unit is designed such that the first switching unit switches from the closed switching state back to the open switching state 5 to 60 seconds, especially 10 to 40 seconds, especially 10 to 30 seconds after the first sensor of the sensor unit has last detected a motion. In this way, a time can be set after which the second light source is switched off automatically. This can be advantageous if the user forgot to close the object that can be opened and closed again after its use.

Furthermore, it has proved to be an advantage if the first light source and/or the second light source include(s) a filament-type light bulb, an LED, and/or luminescent film, especially a multitude of filament-type light bulbs, LEDs, and/or luminescent films.

The overall output of an LED or of the totality of LEDs advantageously is in the range from 200 mW to 300 mW. Each individual LED thus has a luminous intensity of 600 mcd to 2,200 mcd (millicandela).

In addition, it has proved to be an advantage if the illumination device comprises a dimmer that is actuatable by the control unit and with which the power supply to the first light source and/or the second light source can be abruptly or steadily reduced down to zero, especially within 1 second to 90 seconds, especially within 10 seconds to 60 seconds.

It is especially visually appealing if the object that can be opened and closed again comprises a transparent, translucent, and/or opaque material and that the first light source and/or the second light source is/are arranged inside the material of the object that can be opened and closed again, preferably encompassed by it.

In addition, an illumination device according to the present disclosure may have a first sensor of the sensor unit that includes a capacitive sensor.

The illumination device may additionally comprise a display element for displaying at least one piece of information and/or the first light source and/or the second light source may form a display element to display at least one piece of information. This increases the usability of the illumination device.

In a further development of the inventive idea mentioned last, it has proved to be an advantage if the display element can be connected to the electric energy storage device via the first switching unit and/or via the second switching unit and/or if the at least one piece of information includes a time of day, a date, and/or a signal, especially an acoustic alarm signal.

In this case, the display element is activated when a motion is detected or if the illumination device is touched. If the information includes a time of day, a date, and/or a signal, the illumination device functions as a clock.

It is also conceivable that the display element comprises an acoustically, visually, and/or haptically perceivable display of the information. In this way, the illumination device may be used as a radio, a player, especially an MP3 player, or the like.

In addition, it has proved to be useful if the illumination device also comprises a data storage device that is arrangeable in or on the object that can be opened and closed again and that at least one datum can be transferred to and/or stored on said data storage device using an interface unit.

It has also proved to be an advantage if the object that can be opened and closed again forms a container for holding at least one physical element such as drugs, means of payment, cosmetics, and/or other objects.

It is a particular advantage of the illumination device according to the present disclosure that it can easily be found if placed, for example, in a bag, and that it allows the user to see the objects that surround it.

Recognizing the contents of the object that can be opened and closed again is also made considerably easier.

Finally, the object that can be opened and closed again using the illumination device is visually very appealing.

DESCRIPTION OF THE DRAWINGS

Other features, details, and advantages of the invention result from the attached claims and figures that accompany the description of two examples of the invention below, wherein:

DETAILED DESCRIPTION

Figure 1:
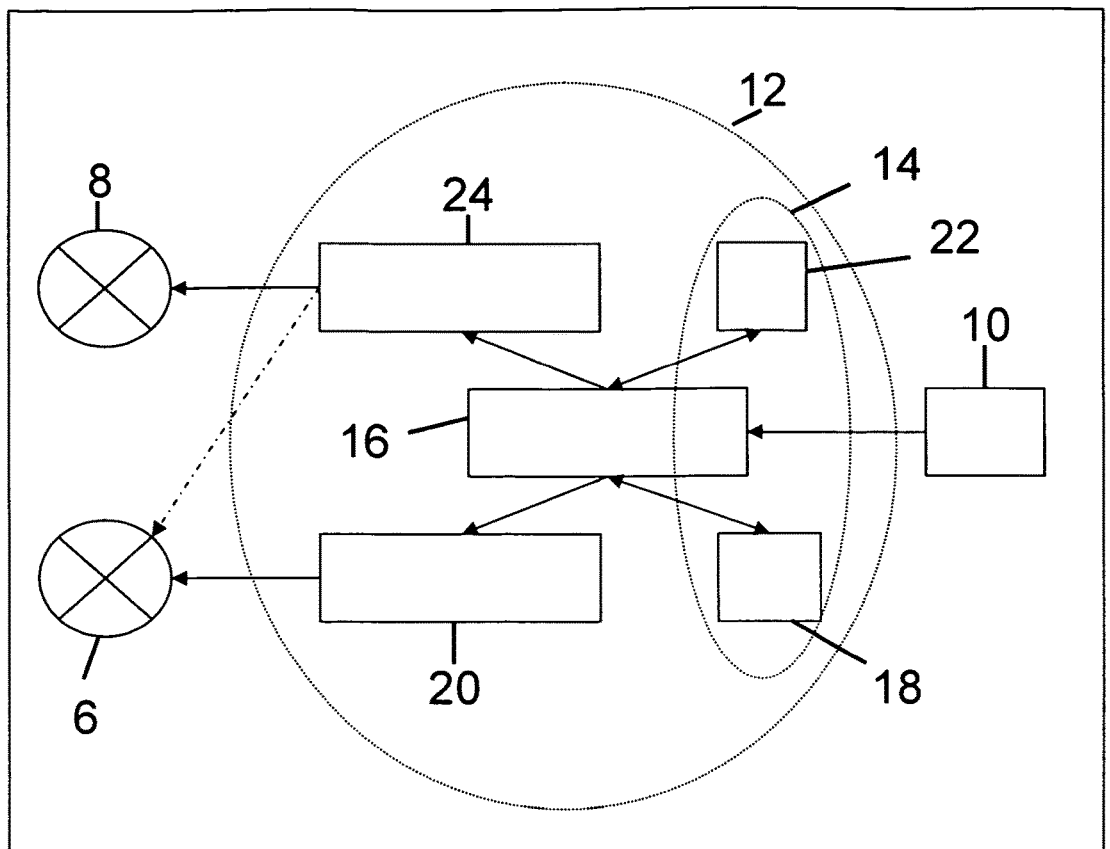
FIG. 1 shows a diagrammatic view of the illumination device according to the present disclosure.

FIG. 1 shows a diagrammatic view of an illumination device designated in total with reference symbol 2. The illumination device 2 is placed in an object 4 that can be opened and closed again, and the example shown in FIG. 1 includes a first light source 6 and a second light source 8. The first light source 6 and the second light source 8 can be supplied with electric power by an electric energy storage device 10. A switch device 12 is functionally inserted between the first light source 6, and the second light source 8, and the electric energy storage device 12. The switch device 12 comprises a control unit 16 that includes a sensor unit 14 with which a first switching unit 20 can be transferred from an open switching state into a closed switching state in which the first light source 6 can be supplied with electric power from the electric energy storage device 10 when a first sensor 18 of the sensor unit 14 is touched and/or when the first sensor 18 of the sensor unit 14 detects a motion. In addition, the sensor unit 14 includes a second sensor 22 that at least detects if the object 4 that can be opened and closed again is open or closed. When the second sensor 22 detects that the object 4 that can be opened and closed again is open, the control unit 16 actuates the second switching unit 24 such that the first light source 6 or the second light source 8 is supplied with electric power from the energy storage device 10.

An operating principle of the illumination device 2 according to the present disclosure is explained below.

When a user approaches the object 4 that can be opened and closed again or touches it, the first sensor 18 of the sensor unit 14 will detect this. The control unit 16 will actuate the switching unit 20 such that it is transferred into a closed switching state, such that the first light source 6 is supplied with electric power and will light up.

When the object 4 that can be opened and closed again is opened, the second sensor 22 of the sensor unit 14 will detect this. In this case, the first light source 6 and/or the second light source 8 is/are supplied with power.

Figure 2:
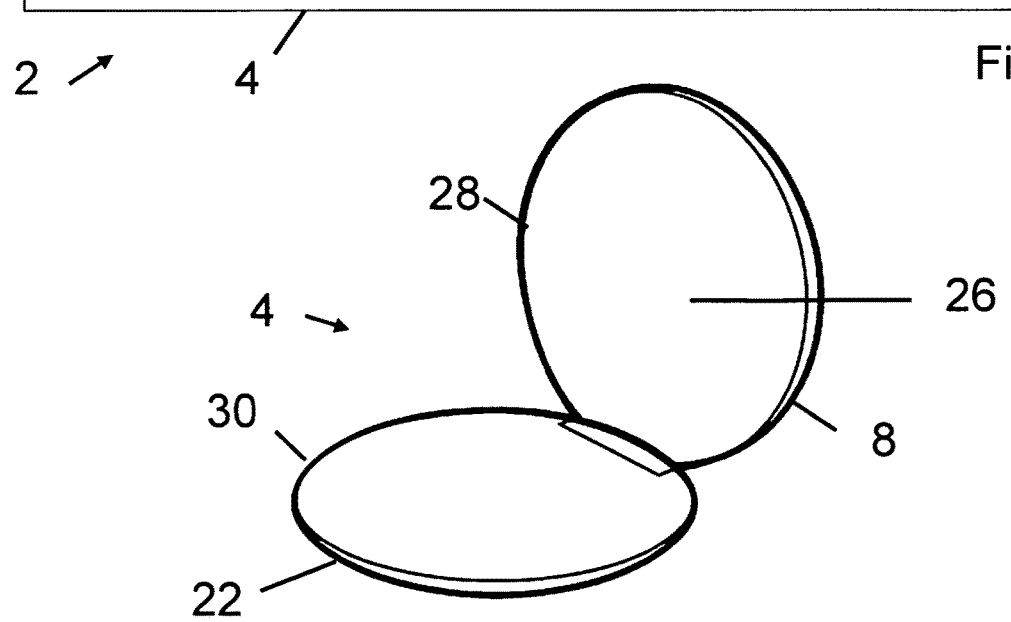
FIG. 2 shows a diagrammatic view of a cosmetics accessory equipped with the illumination device according to the present disclosure.

FIG. 2 shows an object 4 that can be opened and closed again designed as a cosmetics accessory in which an illumination device 2 is provided. The cosmetics accessory may be a fold-open make-up minor. In FIG. 2, it comprises a reflecting surface 26 in the upper image plane. A second light source 8 is arranged around this surface 26. FIG. 2 shows the object 4 that can be opened and closed again in an open position. The two dome-shaped parts 28 and 30 that form the object 4 that can be opened and closed again are at a right angle in the example shown. In this case, a second sensor 22 designed as a magnetic snap lock is separated and the second light source 8 is supplied with electric power and illuminates the contents of the object 4 that can be opened and closed again. The light emitted in this way helps a user to see his or her reflection in the reflecting surface 26.

When the object 4 is closed again, the power supply to the light source 8 is disconnected again.

The features of the invention disclosed in the complete description, the claims, and the figures can be relevant both individually and in combination for implementing the various examples of the invention.

The invention claimed is:

1. An apparatus comprising:
   an illumination device that is operable while being transported and is placed in an object that can be opened and closed again, wherein two dome-shaped parts form the object that can be opened and closed again, and wherein the two dome-shaped parts are formed of or comprise transparent or translucent or opaque material, the illumination device comprising:
      at least a first light source;
      an electric energy storage device; and
      a switch device that comprises a control unit including a sensor unit with which a first switching unit is transferable from an open switching state into a closed switching state;
   wherein the first light source is suppliable with electric power from the electric energy storage device when a first sensor for detecting motion of the sensor unit detects a motion,
   wherein the first sensor of the sensor unit includes a pyrosensor and/or a capacitive sensor,
   wherein the first light source is activated when a user approaches the object,
   wherein the first light source, the electric energy storage device, and the switch device are inside the object that can be opened and closed again and is formed by the two dome-shaped parts,
   wherein the first light source of the object that can be opened and closed again is arranged such that it shines outwards through the surface of each of the dome-shaped parts; and
   wherein the control unit is designed such that the first switching unit switches from the closed switching state back into the open switching state 5 to 60 seconds after the first sensor of the sensor unit has last detected a motion.

2. The apparatus according to claim 1, wherein the illumination device comprises a display element for displaying at least one piece of information, and/or the first light source forms a display element for displaying at least one piece of information.

3. The apparatus according to claim 2, wherein the display element is connectable to the electric energy storage device via the first switching unit, and
   wherein the at least one piece of information includes a time of day, a date, and/or a signal.

4. The apparatus according to claim 2, wherein the display element comprises an acoustically, visually, and/or haptically perceivable display of the information.

5. The apparatus according to claim 1, further comprising a data storage device that is arrangeable in or on the object, and
   wherein at least one datum is transferable to and/or stored on said data storage device using an interface unit.

6. The apparatus according to claim 1, wherein the object that can be opened and closed again forms a container for holding at least one physical element.

7. The apparatus according to claim 1, wherein the illumination device further comprises a dimmer that is actuatable by the control unit and with which the power supplied to the first light source can be abruptly or steadily reduced down to zero.

8. The apparatus according to claim 1, wherein the control unit is designed such that the first switching unit switches from the closed switching state back into the open switching state 5 to 30 seconds after the first sensor of the sensor unit has last detected a motion.

9. The illumination device according to claim 1, wherein the first light source includes a filament-type light bulb, an LED, and/or luminescent film.

\* \* \* \* \*